(12) United States Patent
Liu

(10) Patent No.: US 8,347,184 B2
(45) Date of Patent: Jan. 1, 2013

(54) CLOUD STORAGE DATA ACCESS METHOD, APPARATUS AND SYSTEM

(75) Inventor: Hui Liu, Beijing (CN)

(73) Assignee: Beijing Z & W Technology Consulting Co. Ltd., Beijing (CN)

(*) Notice: Subject to any disclaimer, the term of this patent is extended or adjusted under 35 U.S.C. 154(b) by 184 days.

(21) Appl. No.: 13/000,575

(22) PCT Filed: Dec. 1, 2010

(86) PCT No.: PCT/CN2010/079327
§ 371 (c)(1),
(2), (4) Date: Dec. 21, 2010

(87) PCT Pub. No.: WO2012/071719
PCT Pub. Date: Jun. 7, 2012

(65) Prior Publication Data
US 2012/0137199 A1 May 31, 2012

(30) Foreign Application Priority Data
Nov. 29, 2010 (CN) .......................... 2010 1 0566265

(51) Int. Cl.
*H03M 13/00* (2006.01)
(52) U.S. Cl. ...................................................... 714/770
(58) Field of Classification Search .................. 714/746, 714/6.32, 42, 763, 770, 800; 711/162; 713/165
See application file for complete search history.

(56) References Cited

U.S. PATENT DOCUMENTS

| | | | |
|---|---|---|---|
| 8,132,073 B1 * | 3/2012 | Bowers et al. ................. | 714/755 |
| 2010/0299313 A1 | 11/2010 | Orsini et al. | |
| 2012/0042162 A1 * | 2/2012 | Anglin et al. ................. | 713/165 |
| 2012/0047339 A1 * | 2/2012 | Decasper et al. ............. | 711/162 |

FOREIGN PATENT DOCUMENTS

| | | |
|---|---|---|
| CN | 101605148 A | 12/2009 |
| CN | 101888405 A | 11/2010 |

OTHER PUBLICATIONS

Schwartz et al., Clasas: A key store for cloud, Aug. 2010, IEEE, p. 267-276.*
Greenan et al., Flat XOR based erasure codes in storage systems: consturctions, efficient recovery, and tradeoffs, May 2010, IEEE, p. 1 to 14.*

* cited by examiner

*Primary Examiner* — Shelly A Chase

(57) ABSTRACT

A cloud storage data access method, apparatus and system are provided to enhance data availability and fault tolerance of cloud storage. In accordance with the present application, data redundancy at a cloud storage data center level is created by creating parity values of original data to be stored through parity calculation on a data transmitting end and placing the original data, its parity values and the data used to create the original data parity values in different cloud storage data centers, according to a predetermined data redundant storing rule.

7 Claims, 3 Drawing Sheets

Legend: Di: original data; Pi: parity value

Legend: Di: original data; Pi: parity values

CLOUD STORAGE DATA ACCESS METHOD, APPARATUS AND SYSTEM

RELATED APPLICATIONS

This is a U.S. National Phase Application under 35 USC §371 of International Application PCT/CN2010/079327 filed on Dec. 1, 2010.

This application claims the priority of Chinese Patent Application No. 201010566265.X filed Nov. 29, 2010, the entire content of which is hereby incorporated by reference.

TECHNICAL FIELD

This invention relates to the field of cloud storage technology and especially relates to a cloud storage data access method, apparatus and system.

BACKGROUND OF THIS INVENTION

Data has proven to be an important asset of enterprises, and the rapid growth of data has made enterprises facing unprecedented challenges. Meanwhile, the cost pressure brought by the rapidly changing world economic situation and fierce competition enables enterprises to have to consider how to reduce IT costs and meet the growing storage needs of enterprises.

The existing storage architecture can be classified into two types: one is a proprietary architecture for one party, such as the DAS (Direct Attached Storage), SAN (Storage Area Network, Storage Area Network) and NAS (Network Access Server,). Such storage systems are exclusively used by one party and can provide users with very good control, better reliability and performance, but due to their poor scalability, they do not apply to large-scale deployment; it is quite difficult for users in this mode to flexibly use storage budgets, and a one-time investment is needed to buy storage equipment; along with the increase in storage capacity, the cost control will also face challenges.

The other is a multi-party sharing architecture, that is, cloud storage architecture. According to their different service scopes, they are classified into private cloud and public cloud. The architecture of cloud storage based on network technologies (internet and intranet) provides users with on-demand purchasing and leasing of storage space, and on-demand configuration service; namely, usually, a third party or third-party department in enterprises provides storage apparatus and specialized maintenance personnel. Through the storage service, enterprises or various departments within the enterprises can significantly reduce their internal storage requirements and corresponding administrative costs, to balance the sharply rising storage requirements and business cost pressure. The users who adopt the storage service can be individuals, enterprises, or even departments within the enterprises or branch offices.

In addition to the difference in service target and scope, one key differentiator of public cloud storage system against private cloud storage system and enterprise traditional network backup system is that public cloud storage service providers (data center) are mutually independent. Restricted by concern on data security and compatibility, there is little need for service providers to exchange information and communicate with each other.

The public cloud storage service can be used to cut the storage cost of enterprises and individuals, and increase the flexibility to address data storage requirement, but in reality, there are always various unpredictable causes to make the cloud storage service unavailable, and even make the data in the data center of the cloud storage provider lost or illegally modified. This concern hinders enterprises and individuals from using public cloud storage service, especially when critical business data storing is involved. Typically, the cloud storage service provider goes bankrupt or out of service for other reasons, and which further leads to the risk of data loss. Or due to the service price of cloud storage, enterprises choose smaller providers of cloud storage service, who then goes bankrupt due to poor management. Or because of some irresistible events, such as earthquake or flood, the data in the data center of the cloud storage service provider is lost. Or for some reasons, such as power failure, the data in the data center becomes unavailable temporarily (usually cloud storage service providers promise that their service is 99.99% or 99.999% available). Or due to merger and acquisition or other reasons, human error causes the loss of data in data center. Or virus or hacker attack causes the data in the cloud storage data center lost or illegally modified.

Given the importance of data to enterprises or legal requirements, it is necessary to strengthen fault tolerance of public cloud storage system, especially for corporate or personal critical data.

Traditional method used to improve the availability and fault tolerance of cloud storage data service usually depends on a SLA signed between enterprises and cloud storage service provider, and the RAID mechanism (mainly RAID 2-RAID 6). For references, see David A. Patterson, Garth Gibson, and Randy H. Katz: *A Case for Redundant Arrays of Inexpensive Disks (RAID)*, ACM 1988. RAID 2-RAID 6 system enables to store the parity value of data (already transmitted to storage media) to keep a sufficient redundancy for data and therefore ensure that the disaster at storage hardware level not lead to data loss.

RAID mechanism is usually used for data protection in the data receiving end in network storage. By creating the data redundancy with parity value at the data receiving end it can prevent data loss from storage hardware damage; RAID is only limited to use for creating data redundancy for interconnected storage media within a data center. In summary, RAID can only be used to protect data loss from the damage at storage hardware level, like hard disk and tape, etc.

However, in order to address damage at non-storage hardware level, which may cause cloud storage service temporarily unavailable and user data being not retrievable as expected, the risk of user data being lost or illegally modified, it is necessary to create a new method to enhance availability and fault tolerance of public cloud storage data.

SUMMARY OF THIS INVENTION

The purpose of this application is to provide a cloud storage data access method, apparatus and system to address problems at non-storage hardware level that are not effectively handled by existing cloud storage solutions, which may cause cloud storage service temporarily unavailable and user data not retrievable as expected, the risk of user data being lost or illegally modified This application provides a cloud storage data access method comprising a step of data storing and a step of data retrieving.

The data storing step comprises:

creating parity values of original data on a data transmitting end before the original data is transmitted to multiple cloud storage centers; and transmitting and storing the original data and parity values according to a preset redundant storing rule to the cloud storage data centers separately.

the data retrieving step comprises:

following the preset redundant storing rule to access at least one of the cloud storage data centers into which the original data is stored according to an access request;

determining whether the original data is available in the accessed cloud storage center; if not available, then retrieving the parity value of the original data and the data used to create the parity value from at least one of the other cloud storage data centers; and restoring the original data based on the parity value of the original data and the data used to create the parity value.

This application provides a cloud storage data access apparatus comprising a data storage module and a data retrieval module. The data storage module comprises:

the data storage module comprises:

a parity value creation unit for creating parity values of original data on a data transmitting end before the original data is transmitted to multiple cloud storage centers; and a data transmission unit for transmitting the original data and the parity values created by the parity value creation unit separately to the cloud storage data centers for storage.

the data retrieval module comprises:

an accessibility judgment unit for, according to an access request, following a preset redundant storing rule to access at least one of the cloud storage data centers into which the original data is stored and determining whether the original data is available in the accessed cloud storage data center and returning a judgment result;

a data retrieval unit for retrieving the parity value of the original data and the data used to create the parity value from at least one of the other cloud storage data centers according to an "unavailable" judgment result returned by the accessibility judgment unit; and a data restoration unit for restoring the original data from the parity value and the data used to create the parity value, retrieved by the data retrieval unit.

This invention also provides a cloud storage data access system comprising a data storage module, a data retrieval module, and multiple cloud storage data centers. The data storage module comprises:

the data storage module comprises:

a parity value creation unit for creating parity values of original data on a data transmitting end before the original data is transmitted to multiple cloud storage centers; and a data transmission unit for transmitting the original data and parity values created by the parity value creation unit separately to the cloud storage data centers for storage.

the data retrieval module comprises:

an accessibility judgment unit for according to the access request, following a preset redundant storing rule to access at least one of the cloud storage data centers into which the original data is stored and determining whether the original data is available in the accessed cloud storage data center and returning a judgment result;

a data retrieval unit for retrieving the parity value of the original data and the data used to create the parity value from at least one of the other cloud storage data centers according to an "unavailable" judgment result returned by the accessibility judgment unit; and a data restoration unit for restoring the original data from the parity value and the data used to create the parity value, retrieved by the data retrieval unit.

This invention greatly improves data availability and fault tolerance by creating data redundancy at the cloud storage data center level, which is achieved by creating parity values of original data to be stored through parity calculation on a data transmitting end and placing the original data, its parity values and the data used to create the original data parity values in different cloud storage data centers, according to a predetermined data redundant storing rule.

DETAILED DESCRIPTION OF THE PRESENTLY PREFERRED EMBODIMENTS

This invention will be illustrated with figures and embodiments in detail as follows.

In an embodiment of this invention, by creating parity values of the original data on a data transmitting end before the original data is transmitted to multiple cloud storage centers, and placing the original data to be stored and the parity values in different cloud storage data centers according to a preset redundant storing rule, data redundancy at the cloud storage data center level is created.

Figure 1:
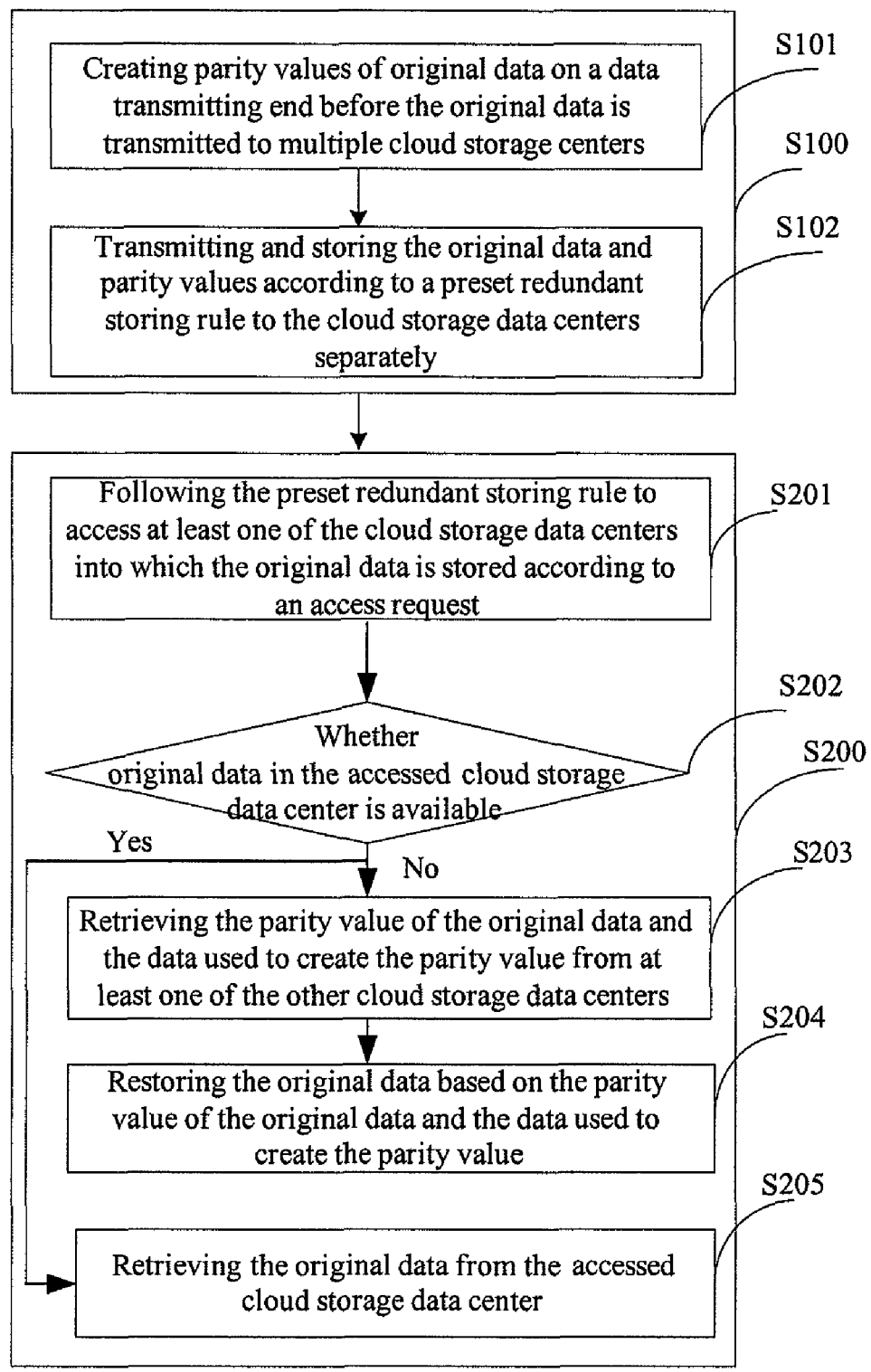
FIG. 1 is a flow chart of a cloud storage data access method in accordance with an the embodiment of the present invention.

As shown in FIG. 1, the embodiment of this invention provides a cloud storage data access method, which comprises data storing step S100 and data retrieving step S200.

The data storing step S100 comprises:

Step S101: creating parity values of original data on a data transmitting end before the original data is transmitted to multiple cloud storage centers.

In practical application, the original data may be entire or partial files; the sum of the number of the data used to create parity values of the original data and the number of the parity values should be divisible by the number of the cloud storage data centers. If not, it needs to be complemented with other data; the parity values of the original data may be created by, but not limited to, XOR, and correspondingly the original data may be restored by the XOR; generally, data used to create the parity value of the original data to be stored comprises the original data and at least one binary number of a fixed length, for example, the original data and a 4-bit binary number 1001 may be used to create parity value by using XOR, or the original data and two 6-bit binary number 100100 and 001000 may be used to create parity value by using XOR, etc.; in addition, users may create one or more parity values of original data according to practical needs.

Step S102: transmitting and storing the original data and parity values according to a preset redundant storing rule to the cloud storage data centers separately.

The original data and parity values are stored separately in different cloud storage data centers. In detail, users can set data redundant storing rules based on their actual needs, store the original data and parity values according to the preset redundant store rules; parity values created may be stored into the same or different could storage data centers; In general, users may store two or more parity values of the same original data into different cloud storage data centers to avoid the case that two or more cloud storage services are unavailable at the same time.

Figure 2:
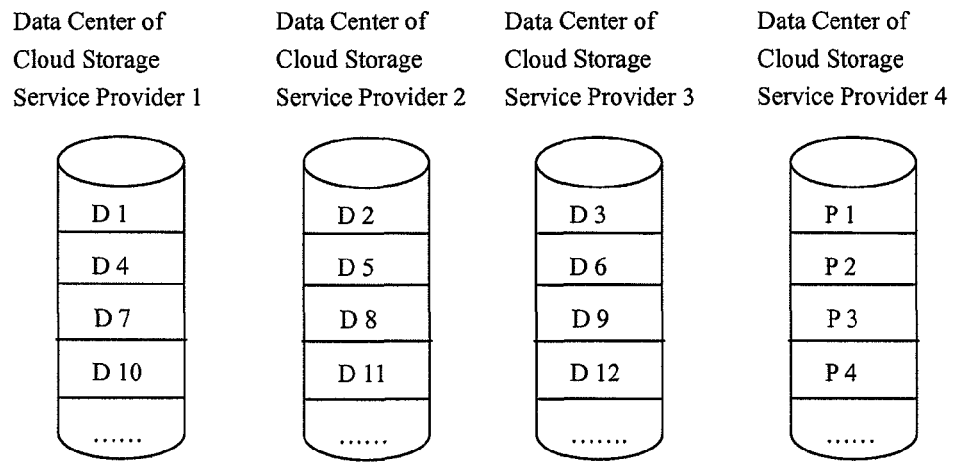
FIG. 2 is a schematic diagram of a data redundancy storing method in accordance with an embodiment of the present invention.
Figure 3:
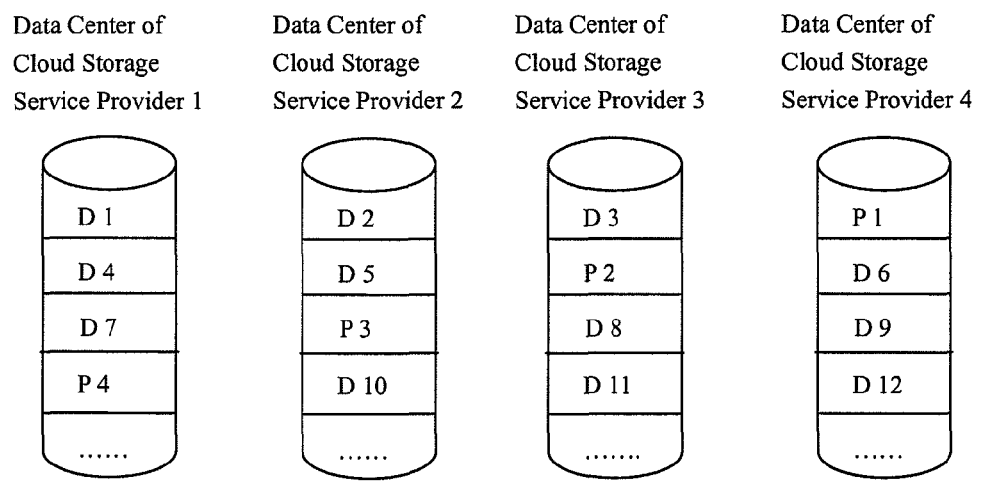
FIG. 3 is a schematic diagram of another data redundancy store method in accordance with an embodiment of the present invention.

There are many data redundant storing rules for the original data and its parity values. Here are two examples:

1. Storing all the parity values of the original data to be stored into the same cloud data storage center. As shown in FIG. 2, if there are four different cloud storage data centers, user may, at the same time, store the first part of original data D1 in the data center of the cloud storage service provider 1, and store the second part of original data D2 and third part of the original data D3 separately in the data centers of the cloud storage service provider 2 and cloud storage service provider 3, and finally, store the parity value P1 of all parts of the original data in the data center of the cloud storage service provider 4; in a similar way, store other original data and the corresponding parity values in the above four cloud storage data centers in turn;

2. Storing all the original data and the corresponding parity values at every cloud storage data centers evenly. As shown in FIG. 3, if there are four different cloud storage data centers available, user may, at the same time, store the first part of original data D1 in the data center of the cloud storage service provider 1, and store the second part of original data D2 and third part of the original data D3 separately in the data centers of the cloud storage service provider 2 and cloud storage service provider 3, and finally, store the parity value P1 of all parts of the original data in the data center of the cloud storage service provider 4; store the original data D4, D5, D6 and their parity value P2 separately in the cloud storage data centers 1,2,4 and 3; in a similar way, store other original data and the corresponding parity values in the above four data centers.

Above are only two examples of the data redundant storing rules for original data and data parity values, in practical application, users may adopt other data redundant storing rules based on their needs, such as, original data and parity values are distributed alternately to data centers.

The data retrieving step S200 comprises:

Step S201: following the preset redundant storing rule to access at least one of the cloud storage data centers into which the original data is stored according to an access request;

Step S202: determining whether the original data is available in the accessed cloud storage center, if not available, execute step S203, if available, execute step S205;

Step S203: retrieving the parity value of the original data and the data used to create the parity value from at least one of the other cloud storage data centers;

Step S204: restoring the original data based on the parity value of the original data and the data used to create the parity value; and Step S205: retrieving the original data from the accessed cloud storage data center;

With correspondence with operation conducted to create the parity value of the original data, the unavailable and irretrievable original data restoration by its parity values also adopts same XOR operation in this embodiment.

An example is shown as follows. If the data redundant storing rule adopts the above second method, as shown in FIG. 3, supposing that the original data stored in the data center of the second cloud storage service provider is unavailable, it's necessary to restore the original data stored in the second cloud storage data center according to other original data and parity values retrieved from the other three cloud storage data centers. In order to restore the original data D2, the original data D1, D3, and the original data D2's parity value P1 require to be retrieved from the other cloud storage centers, and then XOR operation is conducted, that is, $$D2 = D1 \oplus D3 \oplus P1$$

Similarly, other original data stored in the second cloud storage data center can also be restored.

Figure 4:
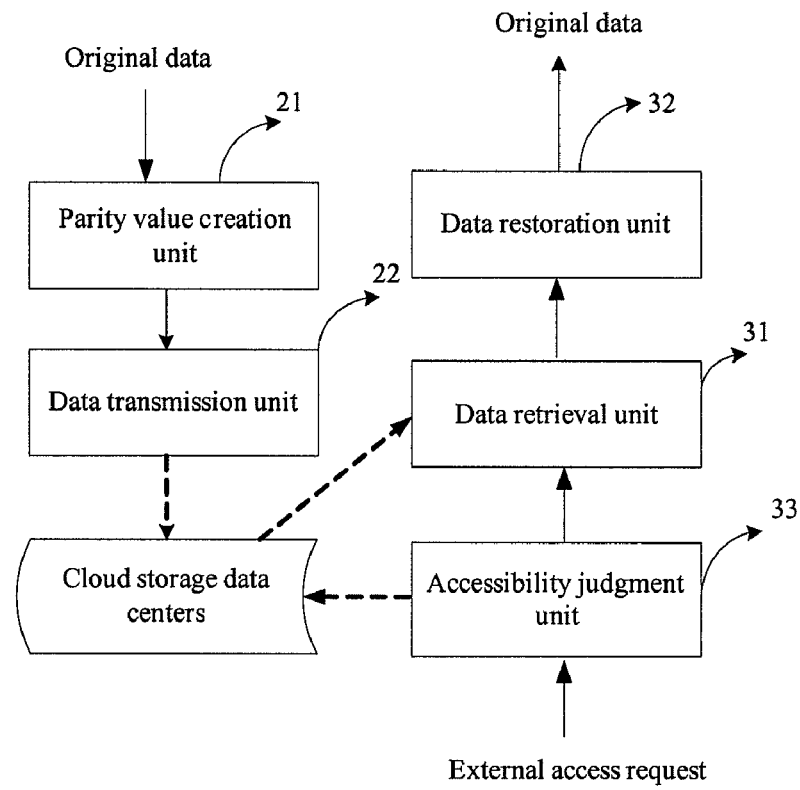
FIG. 4 is a structural diagram of a cloud storage data access apparatus in accordance with an embodiment of the present invention.

As shown in FIG. 4, this invention provides a data access cloud storage apparatus which comprises data storage module 20 and data retrieval module 30.

Data storage module 20 comprises parity value creation unit 21 and data transmission unit 22; data retrieval module 30 comprises accessibility judgment unit 33, data retrieval unit 31 and data restoration unit 32.

When storing data, parity value creation unit 21 creates parity values of the original data on a data transmitting end before the original data is transmitted to multiple cloud storage centers, then the data transmission unit 22 transmits the original data and parity values created by the parity value creation unit 21 separately to the cloud storage data centers according to the preset redundant storing rule.

When there is an original data access request, the accessibility judgment unit 33 will, according to the access request, follow the preset redundant storing rule to access at least one of the cloud storage data centers into which the original data is stored and determine whether the original data stored in the accessed cloud storage data center is available; if not available, the data retrieval unit 31 will retrieve the parity value of the original data and the data used to create the parity value of the original data from at least one of the other cloud storage data centers; the data restoration unit 32 will restore the original data from the parity value of the original data and the data used to create the parity value of the original data retrieved by data retrieval unit 31.

Figure 5:
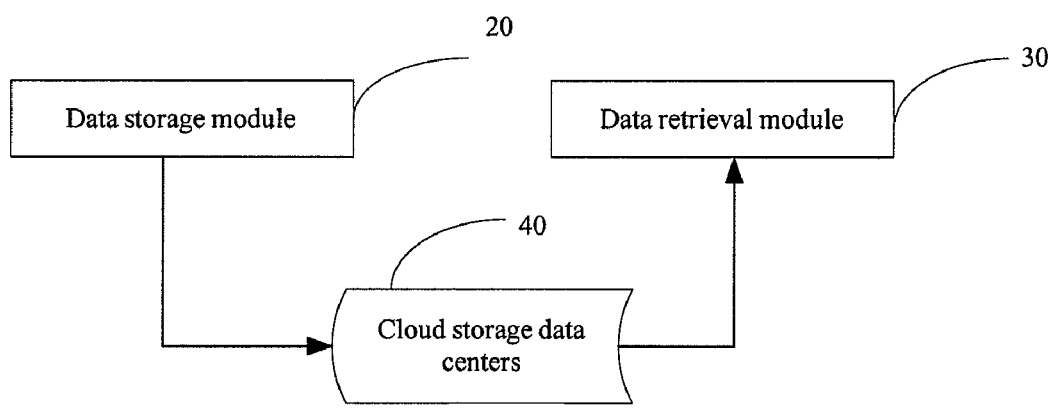
FIG. 5 is a structural diagram of a cloud storage data access system in accordance with an embodiment of the present invention.

As shown in FIG. 5, the embodiment of this invention also provides a cloud storage data access system, which comprises data storage module 20, data retrieval module 30, and cloud storage data centers 40.

Data storage module 20 comprises parity value creation unit 21 and data transmission unit 22; data retrieval module 30 comprises accessibility judgment unit 33, data retrieval unit 31 and data restoration unit 32;

When data is being stored, parity value creation unit 21 creates parity values of the original data on a data transmitting end before the original data is transmitted to multiple cloud storage centers, and then the data transmission unit 22 transmits the original data and parity values created by the parity value creation unit 21 separately to cloud storage data centers 40 according to the preset redundant storing rule;

When there is an original data access request, the accessibility judgment unit 33 will access the at least one of cloud storage data centers 40 that stores the original data according to the preset redundant storing rule as requested and determine whether the original data stored in accessed cloud storage data centers 40 is available; if the original data stored in accessed cloud storage data centers 40 is not available, the data retrieval unit 31 will retrieve the parity value of the original data and the data used to create the parity value of the original data from at least one of cloud storage data centers 40; the data restoration unit 32 will restore the original data from the parity value of the original data and the data used to create the parity value of the original data retrieved by data retrieval unit 31.

A typical instance of the parity value calculation is shown below to illustrate the feasibility of this invention. In this instance, XOR operation is used to calculate data parity values.

a⊕b is identified as the XOR operation between a and b, a, b=0 or 1. XOR operation follows these rules:

1, If a and b are the same (simultaneously equal to 0 or 1), then a⊕b=0; otherwise a⊕b=1;

2. a⊕b⊕c=a⊕(b⊕c)=(a⊕b)⊕c;

3. From d=a⊕b⊕c, conclude that a=d⊕b⊕c

When public cloud storage service is used, the data stored in the third party cloud storage data center would be physically a series of binary values of 0 and 1, no matter whether they are files or data blocks.

Supposing there are three data segments, D1, D2 and D3, to be backed up and stored in a cloud storage data center, if the length of D1, D2 and D3 are not equal with each other, then appending enough 0 is required to make the data segments to have the same length. And there are four different cloud storage data centers available for use.

Before original data is transmitted to predetermined cloud storage data centers, XOR operation is performed on the above original data according to the number of available cloud storage data centers, and then the parity value P1 of the original data to be stored is generated.

Parity value P1=D1⊕D2⊕D3.

The above method is repeated, until parity values of all the original data to be stored are calculated.

If the number of original data to be stored and their corresponding parity values can not be divided by the number of the predetermined cloud storage data centers, users may use other data or a string of 0, 1 with specified length to make up.

The method to generate parity value is well established and the above is just an embodiment of implementation. Users may generate two or more parity values as needed and store them in different cloud storage data centers, in case that the original data in two or more cloud storage services are unavailable at the same time.

After the parity values of all the original data to be stored have been generated, the original data to be stored and their parity values are redundantly stored in different cloud storage data centers according to the number of the available cloud storage data centers, so as to resist the risk that the original data in any cloud storage data center becomes unavailable, lost or illegally modified.

When the original data in the cloud storage data centers is unavailable temporally or for a long period of time, users may restore the original data with the assistance of the parity value of the original data.

In the above embodiment, only one parity value is used to create data redundancy at cloud storage data center level, however in practical application, users can save two or more parity values of original data to ensure that the data can be restored even when the original data in two or more cloud storage data centers are not available at the same time. But the more parity values to use, the more storage space to require, and the more cost to require. As the data restoration method is similar, there is no need to discuss in detail here.

In accordance with an embodiment of this invention, by creating parity values of the original data on a data transmitting end before the original data is transmitted to multiple cloud storage centers, and storing the original data to be stored and the parity values separately into the cloud storage data centers according to a preset rule, data redundancy at cloud storage data center level is created, which can resist the risk of data unavailability, loss or illegal modification caused by the damage at non-storage hardware level and, therefore, enhance the data availability and fault tolerance of public cloud storage service.

Preferred embodiments are provided above to illustrate, but not to limit, the present invention; any changes, equivalent replacement and improvements and other aspects made within the spirit and principle of this invention should be covered in the protective range of this invention.

The invention claimed is:

1. A cloud storage data access method comprising a step of data storing and a step of data retrieving wherein:
   the data storing step comprises:
   creating parity values of original data on a data transmitting end before the original data is transmitted to multiple cloud storage centers; and
   transmitting and storing the original data and parity values according to a preset redundant storing rule to the cloud storage data centers separately;
   the data retrieving step comprises:
   following the preset redundant storing rule to access at least one of the cloud storage data centers into which the original data is stored according to an access request;
   determining whether the original data is available in the accessed cloud storage center; if not available, then retrieving the parity value of the original data and the data used to create the parity value from at least one of the other cloud storage data centers; and
   restoring the original data based on the parity value of the original data and the data used to create the parity value.

2. The method of claim 1 wherein the parity value is created through an XOR operation; and the restoring step is also conducted through an XOR operation.

3. The method of claim 1 wherein the number of the data used to create the parity values of the original data and the parity values is divisible by the number of the cloud storage data centers.

4. The method of claim 1 wherein the data used to create the parity value comprises the original data and at least one binary number of a fixed length.

5. The method of claim 1 wherein the parity values are stored into the same or different cloud storage data centers.

6. A cloud storage data access apparatus comprising a data storage module and a data retrieval module, wherein:
   the data storage module comprises:
   a parity value creation unit for creating parity values of original data on a data transmitting end before the original data is transmitted to multiple cloud storage centers; and
   a data transmission unit for transmitting the original data and the parity values created by the parity value creation unit separately to the cloud storage data centers for storage;
   the data retrieval module comprises:
   an accessibility judgment unit for, according to an access request, following a preset redundant storing rule to access at least one of the cloud storage data centers into which the original data is stored and determining whether the original data is available in the accessed cloud storage data center and returning a judgment result;
   a data retrieval unit for retrieving the parity value of the original data and the data used to create the parity value from at least one of the other cloud storage data centers according to an "unavailable" judgment result returned by the accessibility judgment unit; and a data restoration unit for restoring the original data from the parity value and the data used to create the parity value, retrieved by the data retrieval unit.

7. A cloud storage data access system comprising a data storage module, a data retrieval module, and multiple cloud storage data centers wherein:

the data storage module comprises:

a parity value creation unit for creating parity values of original data on a data transmitting end before the original data is transmitted to multiple cloud storage centers; and a data transmission unit for transmitting the original data and the parity values created by the parity value creation unit separately to the cloud storage data centers for storage;

the data retrieval module comprises:

an accessibility judgment unit for according to the access request, following a preset redundant storing rule to access at least one of the cloud storage data centers into which the original data is stored and determining whether the original data is available in the accessed cloud storage data center and returning a judgment result;

a data retrieval unit for retrieving the parity value of the original data and the data used to create the parity value from at least one of the other cloud storage data centers according to an "unavailable" judgment result returned by the accessibility judgment unit; and a data restoration unit for restoring the original data from the parity value and the data used to create the parity value, retrieved by the data retrieval unit.

* * * * *